United States Patent [19]

Kompelien

[11] Patent Number: 5,903,139
[45] Date of Patent: *May 11, 1999

[54] POWER STEALING SOLID STATE SWITCH FOR SUPPLYING OPERATING POWER TO AN ELECTRONIC CONTROL DEVICE

[75] Inventor: Arlon D. Kompelien, Crosslake, Minn.

[73] Assignee: Honeywell Inc., Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/789,731

[22] Filed: Jan. 27, 1997

[51] Int. Cl.⁶ ........................................................ G05F 1/44
[52] U.S. Cl. .............................. 323/282; 327/537; 307/39
[58] Field of Search .................................... 323/282, 284; 327/537; 307/38, 39; 318/672

[56] References Cited

U.S. PATENT DOCUMENTS

| | | |
|---|---|---|
| 4,753,388 | 6/1988 | Rummage ............................. 236/46 R |
| 4,776,514 | 10/1988 | Johnstone et al. ..................... 236/78 R |
| 4,785,843 | 11/1988 | Nicholson .............................. 137/78.3 |
| 5,218,235 | 6/1993 | Patterson et al. .......................... 307/39 |
| 5,304,781 | 4/1994 | Stalsberg .................................. 219/501 |
| 5,572,104 | 11/1996 | Nold et al. ............................... 318/672 |
| 5,635,896 | 6/1997 | Tinsley et al. ..................... 340/310.05 |

*Primary Examiner*—Adolf Deneke Berhane
*Attorney, Agent, or Firm*—Charles L. Rubow

[57] ABSTRACT

A power stealing circuit provides operating power for a environmental control such as a thermostatic control while controlling the current in a power supply line to a load in response to the cycling output of the environmental control. A pair of power FETs are connected to the series power terminals, and the gates are controlled by logic and phase timers. FETs are turned off at the end of a phase, while a small amount of power sufficient to operate the control and circuitry is diverted to a power storage circuit, then the FETs are turned back without substantial interruption to the load. A preferred embodiment uses a bi-directional charge pump to transfer power between low- and high-voltage power storage circuits. The circuit can operate with symmetrical or nonsymetrical AC or DC loads.

25 Claims, 11 Drawing Sheets

SYMMETRICAL AC LOAD CURRENT IN THE "ON" STATE

NON-SYMETRICAL AC LOAD CURRENT IN THE "ON" STATE

LOAD CURRENT MODE CHANGE
(FULL WAVE TO HALF WAVE RECTIFIED)

LOAD CURRENT MODE CHANGE
(HALF WAVE RECTIFIED TO FULL WAVE)

SYMMETRICAL AC LOAD CURRENT
USING SINGLE TIMER

POWER STEALING SOLID STATE SWITCH FOR SUPPLYING OPERATING POWER TO AN ELECTRONIC CONTROL DEVICE

FIELD OF THE INVENTION

The present invention relates generally to a solid state switching apparatus for controlling the supply of electric current to a load, and more particularly to a method and apparatus for diverting from the supplied current the power required for operation of the switching apparatus.

BACKGROUND OF THE PRIOR ART

A conventional environmental control system utilizes various electrically powered devices such as heating, cooling, ventilating, or air conditioning units. Typically, the environmental control system uses a bi-metal thermostat to activate and deactivate the various devices. The conventional bi-metal thermostat directly switches the alternating current which powers the equipment. Since the bi-metal thermostat is a mechanical device, it does not require any external operating power in order to switch the current.

With the advances in semiconductor components and embedded microprocessors, it has become increasingly common to replace the conventional bi-metal thermostat with a sophisticated electronic thermostat which affords a longer life, quieter operation, and greater flexibility. When replacing a mechanical thermostat with an electronic thermostat, additional power must be supplied for circuit operation. Typically, the additional power is provided by an external transformer and an additional power supply line from the transformer to the electronic thermostat. Alternatively, the electronic thermostat may be powered by an internal battery.

There are several disadvantages to providing power to an electronic thermostat by an external transformer. For example, the additional components increase the cost of replacing a mechanical thermostat with an electronic thermostat. In addition, running the conductor from the transformer to the electronic thermostat may be very difficult and costly.

There are also disadvantages to using a battery for providing the operating power. One primary disadvantage is the need to continually check and replace the battery. If the battery is not properly replaced and cannot provide adequate power, the electronic thermostat may fail during a period of extreme environmental conditions.

It would be desirable to provide electronic thermostat switching circuitry with the necessary power for operation by taking, or "stealing" current from the current supply that is being controlled, so that the need for additional wiring or batteries is eliminated.

While it has been shown that FETs have been connected in opposition with common sources for switching alternating current, an overall best scheme for providing the gate control voltages from power derived off the two load control wires for both the OFF and ON states of the control has not been done. Typically, the two gates of the opposing transistors have also been connected together for ON-OFF control without the capability of stealing some of the current for energizing the electronic control circuitry.

SUMMARY OF THE INVENTION

According to one feature of the invention, there is provided a solid state power switching circuit for controlling the current in a power supply line to a load in response to the cycling output of an environmental control, for example, a temperature control, the circuit including circuitry for diverting operating power from the load current being switched. First and second power transistors are connected together and to a pair of terminals between which a series-connected electrical power source and load may be connected. Switching logic is operatively connected to control the switching of the first and second power transistors to a low impedance ON state in which current is permitted to flow to the load or a high impedance OFF states in which current is substantially blocked from the load, in response to the cycling output of condition sensing apparatus. The switching logic is further operative to independently control the switching of the first and second power transistors during the periods in which the load is to powered to facilitate power stealing. A power storage circuit for providing operating power for the solid state switching circuit is connected to receive current diverted from the load when the power transistors are in an OFF state. A charging control, which for example may be a voltage sense, is coupled to the power storage circuit and is operative to signal the switching logic when the voltage in the power storage circuit reaches a predetermined level. The switching logic includes timing control operative at intervals to switch a power transistors off to thereby temporarily divert current to the power storage circuit. The switching logic is also operative to switch the power transistors back on when the voltage sense indicates that the predetermined level has been reached.

According to another feature of the invention, a low voltage supply is provided for supplying operating voltage to the control circuitry for the switching circuit, and a high voltage supply is provided for supplying operating voltage high enough for control of the gates of the power transistors. A first diversion path operates to deliver power to the high voltage supply when the load is cycled OFF, and another diversion path operates in conjunction with the switching logic to deliver power to the low voltage supply during periods when the load is to be powered by periodically momentarily holding the power transistors OFF until sufficient power has been diverted to replenish the low voltage supply. Preferably, a bi-directional charge pump is connected to transfer power at the appropriate converted voltage from the high voltage supply to the low voltage supply during the OFF cycle of the load and from the low voltage supply to the high voltage supply during the ON cycle.

These and other features and advantages of the invention will become apparent from the following description of the preferred embodiments of the invention.

DESCRIPTION OF THE PRESENT INVENTION

Figure 1:
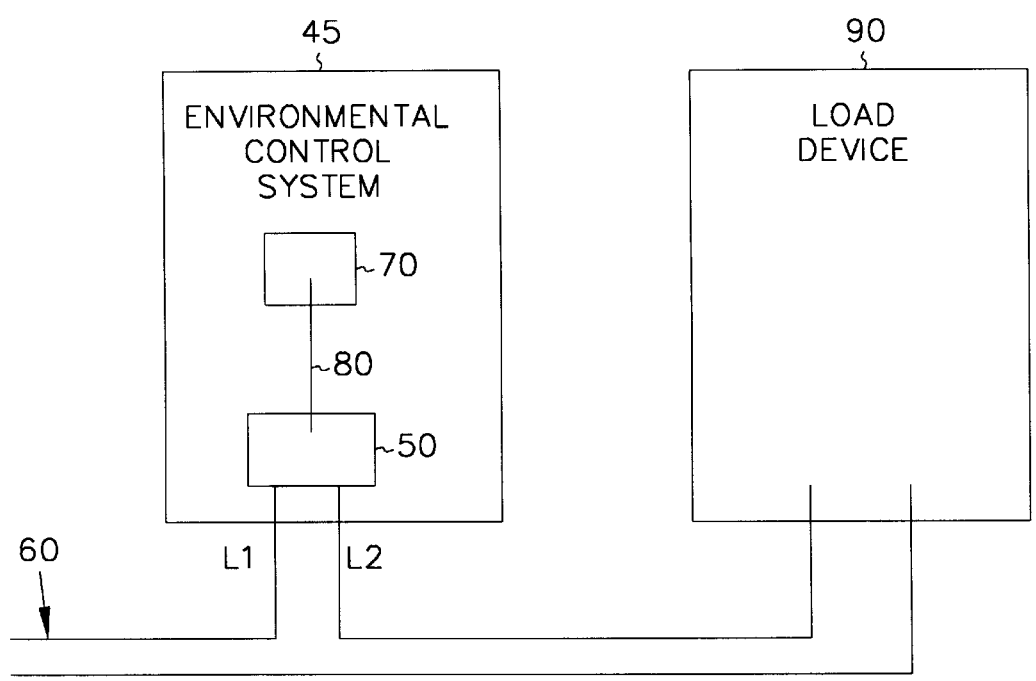
FIG. 1 is a general block diagram of an environmental control system including a power stealing circuit for supplying operating power to an electronic thermostat.

The present invention is a method and apparatus for controlling the supply of current to a load by means of a solid state switching circuit incorporating circuitry for stealing operating power from the controlled current in a manner which is self-synchronized with alternation of the current. During periods in which the load is energized, the switching circuit enters a high impedance state for brief power stealing intervals. The diverted current is used to charge a power storage device which supplies operating power for the circuit.

One of the solid state switching devices which is most adaptable for alternating current applications is a power field effect transistor (FET). This device requires very little power for performing its control function. While single FETs are available which can switch alternating current, they typically have been expensive or have marginal capability to provide reasonably high blocking voltages in the off-state and low impedance in the on-state.

The few disadvantages of a power FET can be overcome by employing two unidirectional low cost power FETs connected in a series back-to-back configuration. In this manner, good voltage blocking capability is provided for both polarities of supplied alternating current, one providing blocking during half cycles of one polarity and the other providing blocking during half cycles of the opposite polarity. When the switching device is in a high impedance OFF state and cuts off current to the load, there is ample voltage across the device and it is relatively easy to steal operating power. In the OFF state, any current diverted by the power stealing circuitry will not affect the performance of the load because the required power for operation in the control circuit is negligible and too small to cause load energization. However, during periods in which the load is to be powered, there is normally no voltage across the device, and stealing operating power is much more difficult during these periods.

The switching device is placed in its high impedance state for short intervals to allow power to be diverted to a low voltage storage capacitor. Since the intervals are short, there is minimal power loss to the load.

Where the power is supplied in the form of alternating current, it is preferable to synchronize the short power diversion intervals with the alternating current waveform. Synchronization may be accomplished by means of circuitry including a zero crossing detector. However, zero crossing detectors typically require sensitive analog components which both add expense to the control circuit, and require space which may not be available.

The applicant has devised a method and apparatus for accomplishing power stealing from conductors carrying alternating or direct current both when a switching device between the conductors is in conducting and nonconducting states. Power stealing according to the applicant's method may be readily accomplished with apparatus which is simple, involves minimum circuitry and is inexpensive to implement.

In the following detailed description, references are made to the accompanying drawings which illustrate specific embodiments in which the invention may be utilized. These embodiments are described in sufficient detail to enable those skilled in the art to practice and use the invention, and it is to be understood that other embodiments may be utilized and that electrical, mechanical, logical and structural changes may be made without departing from the spirit and scope of the present invention. The following detailed description is, therefore, not to be taken in a limiting sense. The scope of the present invention is defined by the appended claims and their equivalents.

FIG. 1 illustrates an implementation of environmental control system 45 which relies on power stealing and load switching circuit 50 for supplying operating power. The power stealing part of circuit 50 receives power from power supply line 60 via load terminals $L_1$ and $L_2$ which are connected through one or more switching devices in the circuit. Temperature control unit 70 monitors the temperature of the controlled environment and controls the load switching by cycling output 80 in order to maintain the desired temperature. Based on the cycling output 80, power stealing and load switching circuit 50 controls a load device 90 by switching the current in power supply line 60. For typical thermostat circuits, the voltage across power supply line 60 is 24 volts R-MS at 50 or 60 Hertz. When cycling output 80 indicates load 90 is to be energized, circuit 50 enters an ON state and allows current to flow to the load. If load 90 is to be de-energized, circuit 50 enters an OFF state and inhibits current from flowing to the load. In a typical application, load device 90 may be a furnace or other suitable environmental control device such as a energy recovery device, a system fan, or a cooling device.

Dual-timer Embodiment

Figure 2:
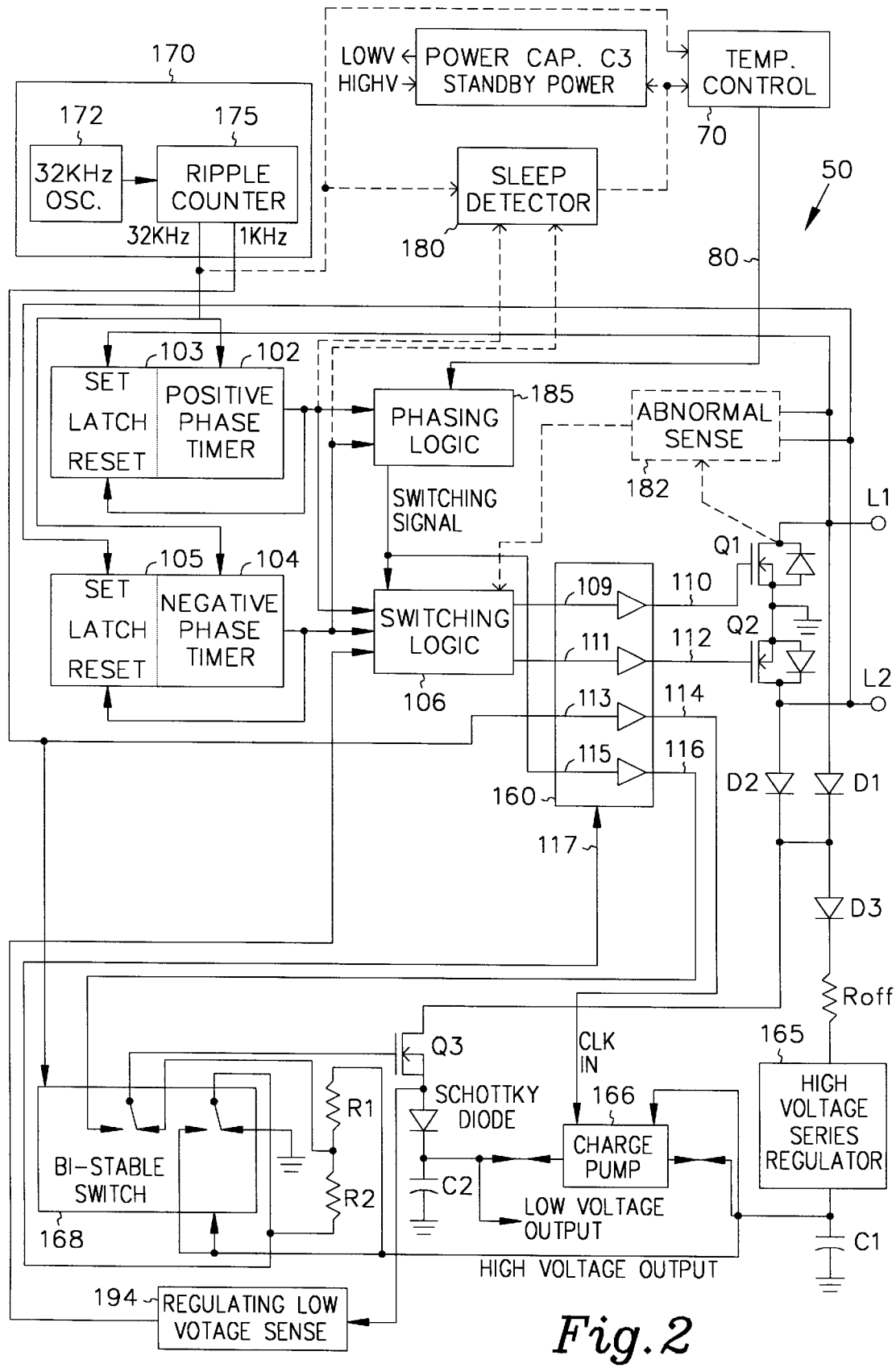
FIG. 2 is a functional block diagram of a dual-timer embodiment of a solid state power switching circuit including operating power stealing circuitry.

FIG. 2 illustrates one embodiment of power stealing and load switching circuit 50. Circuit 50 comprises two suitable unidirectional field effect power transistors $Q_1$ and $Q_2$. In one embodiment the transistors are N channel field effect power transistors. The source of transistor $Q_1$ is connected to the source of transistor $Q_2$ thereby forming a series back-to-back configuration. Furthermore, the sources of transistors $Q_1$ and $Q_2$ are connected to the circuit common. The drains of transistor $Q_1$ and $Q_2$ are connected to the load terminals $L_1$ and $L_2$, respectively.

In one embodiment transistors $Q_1$ and $Q_2$ have channel resistances of approximately 50 milliohms. In such an embodiment transistors $Q_1$ and $Q_2$ in series produce 0.1 ohms of resistance when power stealing circuit 50 is in the ON state. If the current in power supply line 60 is 1 amp, the 0.1 ohm resistance results in a dissipation of only 0.1 watt. The heat dissipation from this is low enough that it will not affect the ability of a thermostat to accurately control the temperature of the environment. Such a feature is important in order to facilitate construction of a compact thermostat. In addition, the lower the power dissipated by transistors $Q_1$ and $Q_2$, the greater the range of load currents the circuit can switch on its two terminals without affecting the controlled load operation.

Transistors $Q_1$ and $Q_2$ are separately controlled by low voltage, solid state circuitry, switching logic 106 as a function of signals applied to its inputs. The two outputs of switching logic 106 feed to voltage level shifting drivers 160. As illustrated in FIG. 2, drivers 160 have four outputs 110, 112, 114, and 116 which are the shifted voltage levels of the four inputs 109, 111, 113 and 115 respectively. Drivers 160 shift the voltages present on their inputs to a higher voltage level present on input 117 which is a suitable voltage level for activating transistors $Q_1$ and $Q_2$ to a low impedance ON state.

Switching logic 106 separately controls transistors $Q_1$ and $Q_2$ based upon inputs received from positive phase timer 102, negative phase timer 104 and regulating low voltage sense 194. As will be explained in detail, positive phase timer 102 is used to determine when power stealing circuit 50 will steal power during the positive phase of the current in power supply line 60 of FIG. 1, which is assumed to be alternating current for purposes of the present description. Similarly, negative phase time 104 determines when power stealing circuit 50 will steal power during the negative phase of the current in supply line 60. The use of two timers allows for efficient power stealing regardless of the waveform of the load current in supply line 60, assuming it is periodic, at 50 or 60 Hz, or direct current. In another embodiment, described below, a single timer may be used when the load current in supply line 60 is symmetrical, alternating current.

One problem which may arise from stealing power from a relay or contactor type of load is that activation can cause a small migration of metal between of the relay or contactor contacts if switching always occurs on the same phase of the alternating current power. In one embodiment, power stealing circuit 50 includes phasing logic 185 in order to reduce the metal migration in the contacts of load device 90. As illustrated in FIG. 2, the outputs of phase timers 102 and 104 are provided to phasing logic 185. In addition, phasing logic 185 receives cycling output 80 from temperature control 70. The output of phasing logic 185 is provided to switching logic 106.

When temperature control 70 activates cycling output 80, indicating that the load device 90 should be activated, phasing logic 185 ensures that activation of load device 90 for successive ON cycles alternates on positive and negative phases of the load current present in power supply line 60. In this manner the migration of metal is essentially canceled out giving better contact life.

As illustrated in FIG. 2, power stealing circuit 50 has a low voltage output which is generated from power stolen from the power supply line 60. The low voltage is maintained in low voltage capacitor $C_2$. In one embodiment, the low voltage is 3 volts. One reason for generating a 3 volt level is that 3 volts is suitable for operating conventional digital logic. For example, the 3 volt output is suitable for powering temperature control 70 which typically comprises a solid state sensor such as a temperature variable resistor.

Transistors $Q_1$ and $Q_2$ require a high gate voltage significantly higher than 3 volts in order to provide a low channel resistance while power stealing circuit 50 is in the ON state. Therefore, in one embodiment, as illustrated in FIG. 2, power stealing circuit 50 provides a 3 volt low voltage output for operation of the digital logic components and a 9 volt output for the gates of transistors $Q_1$ and $Q_2$. In another embodiment, power stealing circuit 50 may supply a range of voltages without departing from the present invention.

Charge pump 166 is a bi-directional device which assists in providing both the low voltage output and the high voltage output. In one embodiment, charge pump 166 is of the type described in copending U.S. patent application Ser. No. 08/789,729 entitled "Bidirectional DC/DC Voltage Converter" by Arlon D. Kompelien, filed on even date herewith, which is hereby incorporated by reference. When power stealing circuit 50 is in the ON state, some power is bypassed to the low voltage capacitor $C_2$ and charge pump 166 steps up the low voltage and drives the high voltage output. When power stealing circuit 50 is in the OFF state, current is fed to the high voltage capacitor $C_1$ and charge pump 166 drives the low voltage output. While providing the high voltage required for the gates of transistors $Q_1$ and $Q_2$ in the ON state, charge pump 166 also maintains minimum bleed current through load device 90 when controlled to the OFF state by reducing the current required for control circuit operation when stepping the voltage up by a factor of three.

Bi-stable switch 168 comprises a double pole, double throw solid state switch (shown here as mechanical switches for purposes of illustration). As described in detail below, bi-stable switch 168 takes the state shown in FIG. 2 when insufficient voltage is provided by capacitor $C_2$. When the voltage on capacitor $C_2$ is sufficient to start the 32 kHz oscillator 172, bi-stable switch 168 places its switches in the conducting states opposite to that shown in FIG. 2.

Other functions can be readily added to power stealing circuit 50. In one embodiment, additional logic such as sleep detector 180 and abnormal sense 182 respectively may detect interruptions of supply current and excessive current flows through $Q_1$ and $Q_2$ of power stealing circuit 50. Sleep mode detector 180 receives the outputs of phase timers 102 and 104. If sleep detector 180 detects that neither phase timer 102 or 104 has been active for a predetermined period, such as a half second, power must not be available from power supply line 60. Sleep detector 180 activates standby capacitor $C_3$ or possibly a standby battery (not shown) which supplies power for an extended period of time. Standby capacitor $C_3$ is any suitable capacitor and typically has a capacitance on the order of 1.0 farads. In addition, sleep detector 180 provides an output to temperature control 70 such that if power loss is detected, temperature control 70 stops cycling and minimizes its power drain.

Abnormal sense 182 senses an overload current in transistors $Q_1$ and $Q_2$ and has an output which signals switching logic 106 when overload current is sensed. Switching logic 106 immediately turns off transistors $Q_1$ and $Q_2$ and may occasionally do retries by turning on transistors $Q_1$ and $Q_2$. In this manner, abnormal sense 182 protects transistors $Q_1$ and $Q_2$ under short circuit conditions due to improper wiring or malfunctioning of load device 90.

Startup Operation

When power stealing circuit 50 first receives power from power supply line 60, transistors $Q_1$ and $Q_2$ are not conducting because bi-stable switch 168 prevents drivers 160 from providing the required high gate voltage. Since both transistors $Q_1$ and $Q_1$ are not conducting, current will flow through diode $D_1$ or diode $D_2$ when a voltage is initially supplied by power supply line 60. Whether current flows through diode $D_1$ or $D_2$ depends on the polarity of the voltage.

Assuming the current is flowing through diode $D_1$, it will flow through diode $D_3$, dropping resistor $R_{OFF}$, high voltage series regulator 165, high voltage storage capacitor $C_1$, the circuit common and back through the body diode of transistor $Q_2$. Similarly, if the current is flowing through diode $D_2$, it will flow through diode $D_3$, dropping resistor $R_{OFF}$, high voltage series regulator 165, high voltage storage capacitor $C_1$, the circuit common and back through the body diode of transistor $Q_1$.

This initial current causes high voltage storage capacitor $C_1$ to begin charging. As the high voltage storage capacitor $C_1$ is charging, its voltage is supplied to the bi-stable switch 168. The voltage is also fed to a voltage divider formed by resistors $R_1$ and $R_2$ connected in series. Before sufficient voltage is present at the low voltage output, bi-stable switch 168 has its switches as shown in FIG. 2, and the voltage present at the divider point of $R_1$ and $R_2$ is fed to the gate of transistor $Q_3$. Transistor $Q_3$ is any suitable power FET and may be similar to transistors $Q_1$ and $Q_2$.

As high voltage storage capacitor $C_1$ continues to charge, transistor $Q_3$ acts as a source follower. Activation of transistor $Q_3$ allows a portion of the small current flowing through diodes $D_1$ or $D_2$ to flow through $Q_3$, the Schottky diode and into the low voltage capacitor $C_2$ before returning through the circuit common and through the body diode of transistor $Q_1$ or $Q_2$ and ultimately to load device 90. In this manner, low voltage capacitor $C_2$ charges until sufficient voltage is present to operate the low voltage sections of power stealing circuit 50.

When the low voltage capacitor $C_2$ has charged sufficiently, providing the low voltage output, it starts the timing oscillator 170. In one embodiment, timing oscillator 170 comprises a 32 kHz oscillator 172 feeding a ripple counter 175 having a low frequency output and a high frequency output. FIG. 2 illustrates one embodiment of timing oscillator 170 in which the low frequency output is 1 kHz and the high frequency output is 32 kHz.

When timing oscillator 170 is activated, its low frequency output triggers bi-stable switch 168 causing its double pole, double throw switch to change state. In this configuration, the voltage present at high voltage capacitor $C_1$ is fed to drivers 160 thereby enabling drivers 160 and coupling the gate of transistor $Q_3$ to the switching signal of phasing logic 185. The low frequency output of oscillator 170 then also enables charge pump 166.

Startup of power stealing circuit 50 is essentially complete when low voltage capacitor $C_2$ has reached a sufficient voltage to cause bi-stable switch 168 to change state. In this configuration, transistor $Q_3$ operates as a switch rather than a source follower. As such, when power stealing circuit 50 is in the ON state, transistor $Q_3$ is active and provides a closed loop for current flow during the short power stealing intervals, as described above. When power stealing circuit 50 enters the ON state, outputs 110 and 112 of drivers 160 are applied to the gates of transistors $Q_1$ and $Q_2$, respectively, such that the current channels of transistors $Q_1$ and $Q_2$ are capable of conducting in either direction. In this case, the gates of transistors $Q_1$ and $Q_2$ are controlled independently by the switching logic 106.

When temperature control 70 deactivates cycling output 80, power stealing circuit 50 is in the OFF state and transistors $Q_1$, $Q_2$ and $Q_3$ are inactive. Transistors $Q_1$ and $Q_2$ block the voltage on power supply line 60 for both voltage phases. One transistor provides voltage blocking during the one polarity of the voltage on power supply line 60 and the other transistor provides voltage blocking for the opposite polarity. After startup, the voltage divider formed by $R_1$ and $R_2$ is essentially disconnected from circuit common by the configuration of bi-stable switch 168 and is effectively bypassed. In this manner, $R_1$ and $R_2$ will not consumer any power after startup.

Once power stealing circuit 50 is operational, it can steal adequate power from a full-wave alternating load current, a direct load current, or a half-wave rectified load current. Switching logic 106 detects when timers 102 and 104 are simultaneously inactive and when phase timers 102 and 104 are simultaneously active. As will be explained in detail below, a direct current or a half-wave rectified load current condition is sensed when both phase timers 102 and 104 are expired at the same time. Also explained below, is symmetric and non-symmetric full-wave load current condition is sensed when phase timers 102 and 104 are concurrently active. In this manner, switching logic 106 detects when the load current is full wave, as compared to direct current or half-wave rectified, and controls transistors $Q_1$ and $Q_2$ accordingly.

Operation for Symmetric and Non-Symmetric Full-Wave, A.C. Load Current

Figure 3:
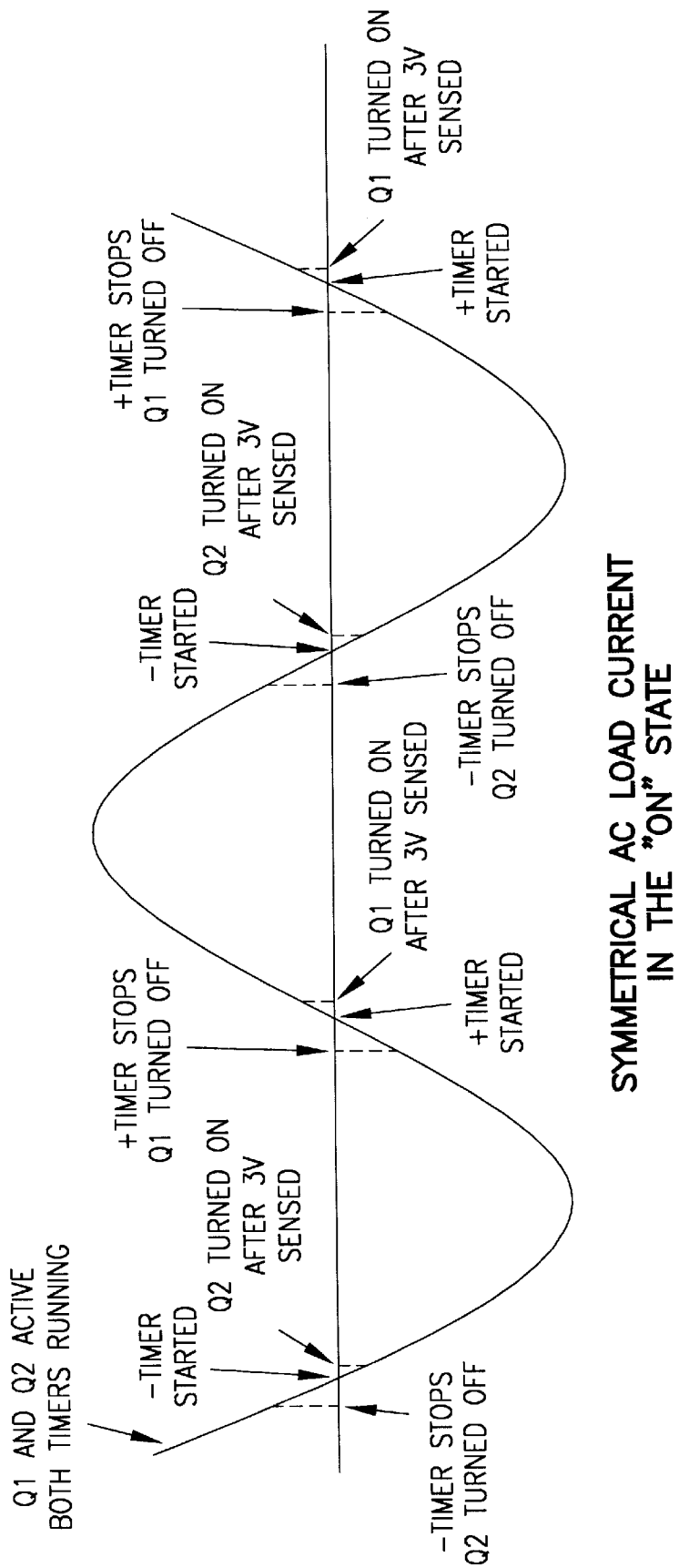
FIG. 3 illustrates the operation of the dual-timer embodiment when the load current is a full-wave, symmetrical alternating current.

FIG. 3 illustrates the operation of the dual-timer embodiment when the load current is a full-wave, symmetrical alternating current. In order to charge low voltage capacitor $C_2$ to a low voltage while power stealing circuit 50 is in the "ON" and without a current transformer, transistors, $Q_1$ and $Q_2$, must be turned off for short intervals of time. During these short time intervals; the load current is diverted into low voltage capacitor $C_2$ while causing a small voltage drop across $L_1$ and $L_2$. High voltage capacitor $C_1$ is charged through the charge pump 166 during periods in which the load is to be powered. In order to minimize transient effects on the load current, it is desirable to provide these charging periods at points where the load currents are minimal. Therefore, when power supply line 60 is supplying alternating current, it is desirable to synchronize power stealing intervals with the zero crossings of the alternating current.

After the startup operation described above, both transistors $Q_1$ and $Q_2$ are active and both phase timers 102 and 104 are running. As illustrated in FIG. 3, just prior to the zero crossing, negative phase timer 104 expires causing switching logic 106 to turn off transistor $Q_2$ such that the load current is forced to flow through the body diode of $Q_2$. This causes a small voltage loss to the load of about 0.7 volts until the voltage reaches the zero crossing. This slight increase in power loss has minimal effects since it occurs when the load current is approaching zero. This minimizes current transition power losses and places less requirements on the switching speeds of transistors $Q_1$ and $Q_2$.

After the load current reverses direction and flows into terminal $L_2$, it is forced into low voltage capacitor $C_2$ since no direct conductive path through transistors $Q_1$ and $Q_2$ exists. This current flows into terminal $L_2$, through diode D2, transistor $Q_3$, the Schottky diode, into the low voltage capacitor $C_2$, through the circuit common, through transistor $Q_1$, which is active, and out through terminal $L_1$. The diverting of the load current to recharge low voltage capacitor $C_2$ causes the voltage across terminals $L_2$ and $L_1$ to jump to a value slightly greater than the low voltage output. This voltage is fed back to negative phase timer 104 and sets latch 105 of negative phase timer 104. Setting latch 105 restarts negative phase timer 104. In this manner, negative phase timer is restarted close to the zero crossing in the negative direction and will expire just prior to the next zero crossing in the negative direction.

After zero crossing, when some the load current is replenishing low voltage capacitor $C_2$, the voltage at the anode of the Schottky diode is increasing slightly in value. This voltage is slightly above the low voltage output to allow for the Schottky diode drop. When low voltage sense 194 senses a sufficient voltage at the anode of the Schottky diode, it activates its output causing switching logic 106 to turn transistor $Q_2$ back on. This allows the load current to again flow directly through the transistors $Q_1$ and $Q_2$ without being diverted through power stealing circuit 50 and with minimal voltage loss.

Similarly, just prior to the zero crossing in the positive direction, positive phase timer 102 expires causing switching logic 106 to turn off transistors $Q_1$ such that the load current is forced to flow through the body diode of $Q_1$.

After the load current reverses direction and flows into terminal $L_1$, it is forced into replenishing the low voltage capacitor $C_2$ since no direct conductive path through transistors $Q_1$ and $Q_2$ exists. This current flows into terminal $L_1$, through diode D1, transistor $Q_3$, the Schottky diode, into the low voltage capacitor $C_2$, through the circuit common, through transistor $Q_2$, which is active, and out through terminal $L_2$. Reversal of the load current sets latch 103 and restarts positive phase timer 102 which again will expire just prior to the next zero crossing in the positive direction. Again, when low voltage sense 194 senses a sufficient voltage at the anode of the Schottky diode, it activates its output causing switching logic 106 to turn transistor $Q_1$ back on, whereby the load current flows directly through the transistors $Q_1$ and $Q_2$ without being diverted through power stealing circuit 50.

Therefore, negative phase timer 104 predicts the zero crossings when the load current is decreasing and positive phase timer 102 predicts zero crossings when the load current is increasing. In one embodiment, the timing used for phase timers 102 and 104 is fixed and equal to the period of the alternating supply voltage. In another embodiment, phase timers 102 and 104 can be adjusted for different frequencies of the load supply voltage.

Figure 4:
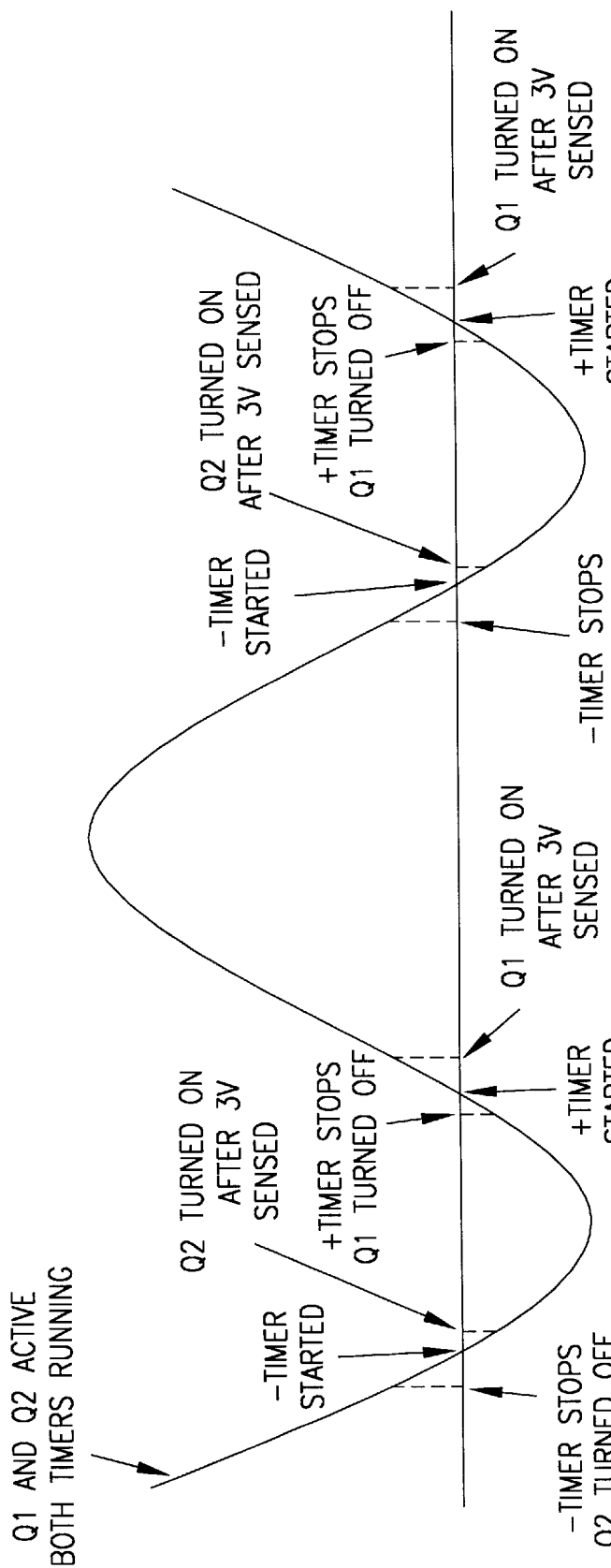
FIG. 4 illustrates the operation of the dual-timer embodiment when the load current is a non-symmetrical, full-wave alternating current.

As illustrated in FIG. 4, for a non-symmetrical, full-wave load current, the time from a zero crossing in a negative direction to that of going in a positive direction may be different than that from a zero crossing in a positive direction to that of going in a negative direction. This is the reason for dual timers. However, for asymmetrical load current where a single timer could be used, the operation of power stealing circuit 50 is identical to the described operation.

Operation for Direct and Half-Wave Rectified Load Currents

With a half-wave or D.C. load current, switching logic 106 controls transistors $Q_1$ and $Q_2$ differently than for a full-wave alternating load current. As with full-wave load current, both transistors $Q_1$ and $Q_2$ are active in order to minimize power dissipation. When positive phase timer 102 expires, however, both transistors $Q_1$ and $Q_2$ are turned off in order to steal power from power supply line 60.

Figure 5:
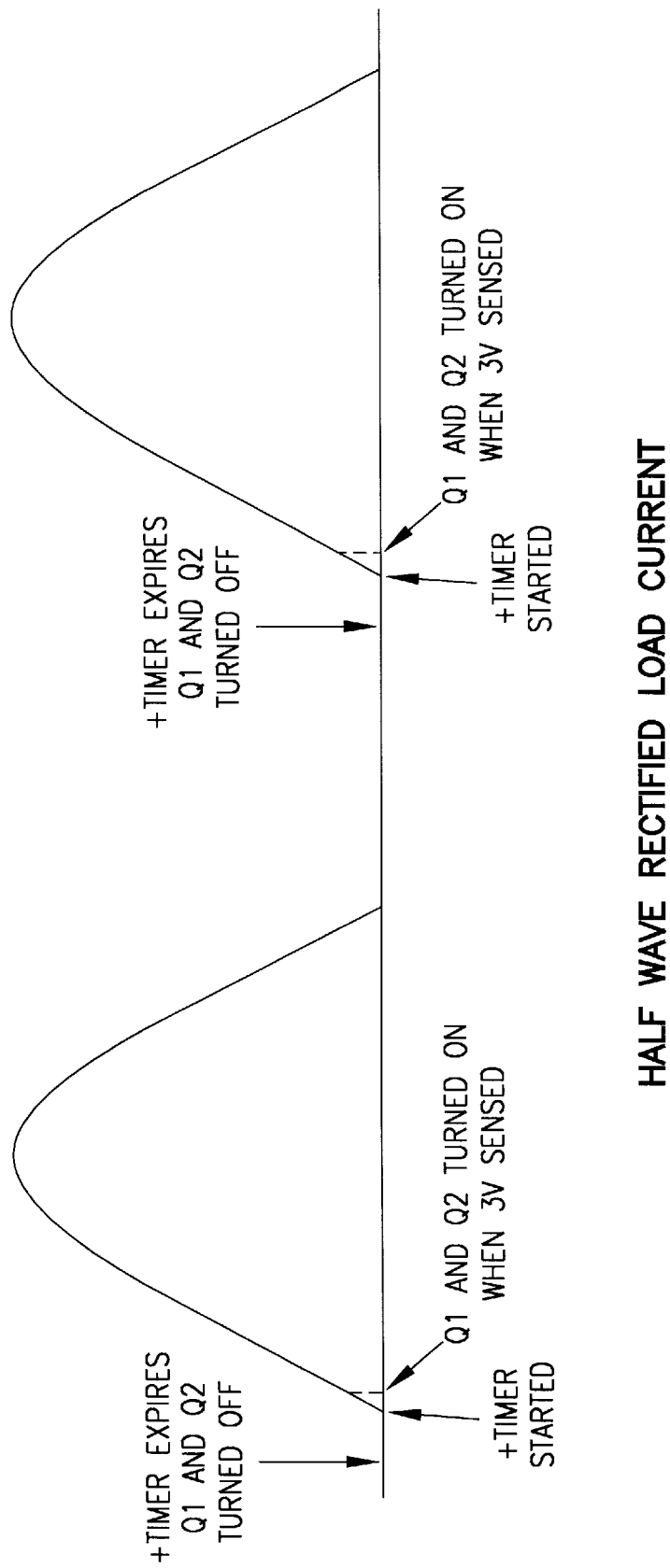
FIG. 5 illustrates the operation of the dual-timer embodiment when the load current is a half-wave rectified current.

FIG. 5 illustrates the operation of power stealing circuit 50 for a half-wave rectified load current. Positive phase timer 102 expires just prior to the positive phase of the half-wave load current and transistors $Q_1$ and $Q_2$ are turned off. When load current starts flowing again, it is forced into charging low voltage capacitor $C_2$. When the voltages of the load current rises, positive phase timer 102 is restarted due to the voltage fed from terminal $L_1$ to latch 103 and will expire prior to the next positive swing of half-wave rectified load current. Once low voltage sense 194 detects sufficient low voltage on low voltage capacitor $C_2$, both transistors $Q_1$ and $Q_2$ are turned ON to repeat the cycle.

Figure 6:
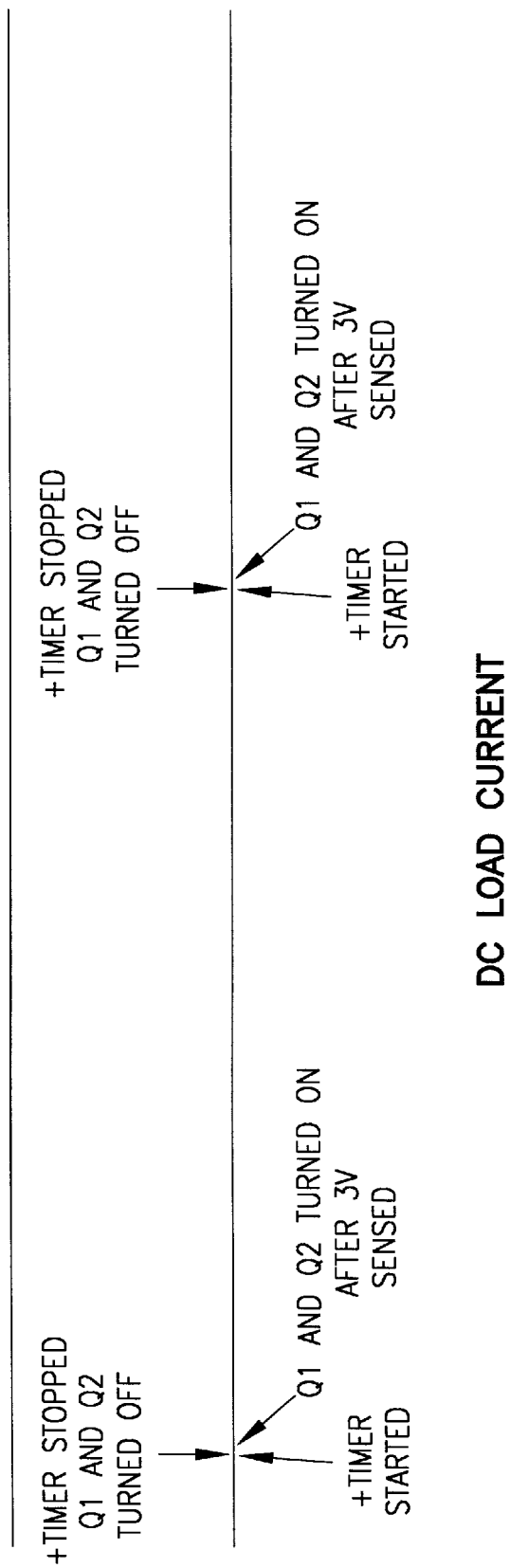
FIG. 6 illustrates the operation of the dual-timer embodiment when the load current is a direct current.

As illustrated in FIG. 6, for D.C. load current, there is no point where the current drops to zero. As with half-wave rectified load current, positive phase timer 102 expires and both transistors $Q_1$ and $Q_2$ are turned off. The voltage across the terminals $L_1$ and $L_2$ quickly rises setting latch 103 and starting positive phase timer 102. Transistors $Q_1$ and $Q_2$ are turned on when low voltage sense 194 senses sufficient voltage at the Schottky diode. The D.C. load current is forced to charge the low voltage capacitor after each expiration of positive phase timer 102. One skilled in the art will recognize that for any type of load current, power stealing circuit 50 could be connected in either polarity, the only effect in power stealing circuit 50 is which phase timer 102 or 104 is cycling transistors $Q_1$ and $Q_2$.

Operation with a Changing Load Current

When controlling a load device, it is possible for the load current to change waveform. One primary reason that both transistors $Q_1$ and $Q_2$ are turned off for D.C and half-wave load currents, is to detect such a mode change. If one transistor were left on, as for a full-wave load current, its low impedance would prevent detecting a supply polarity change by shunting the load current and preventing the low voltage pulse.

Figure 7:
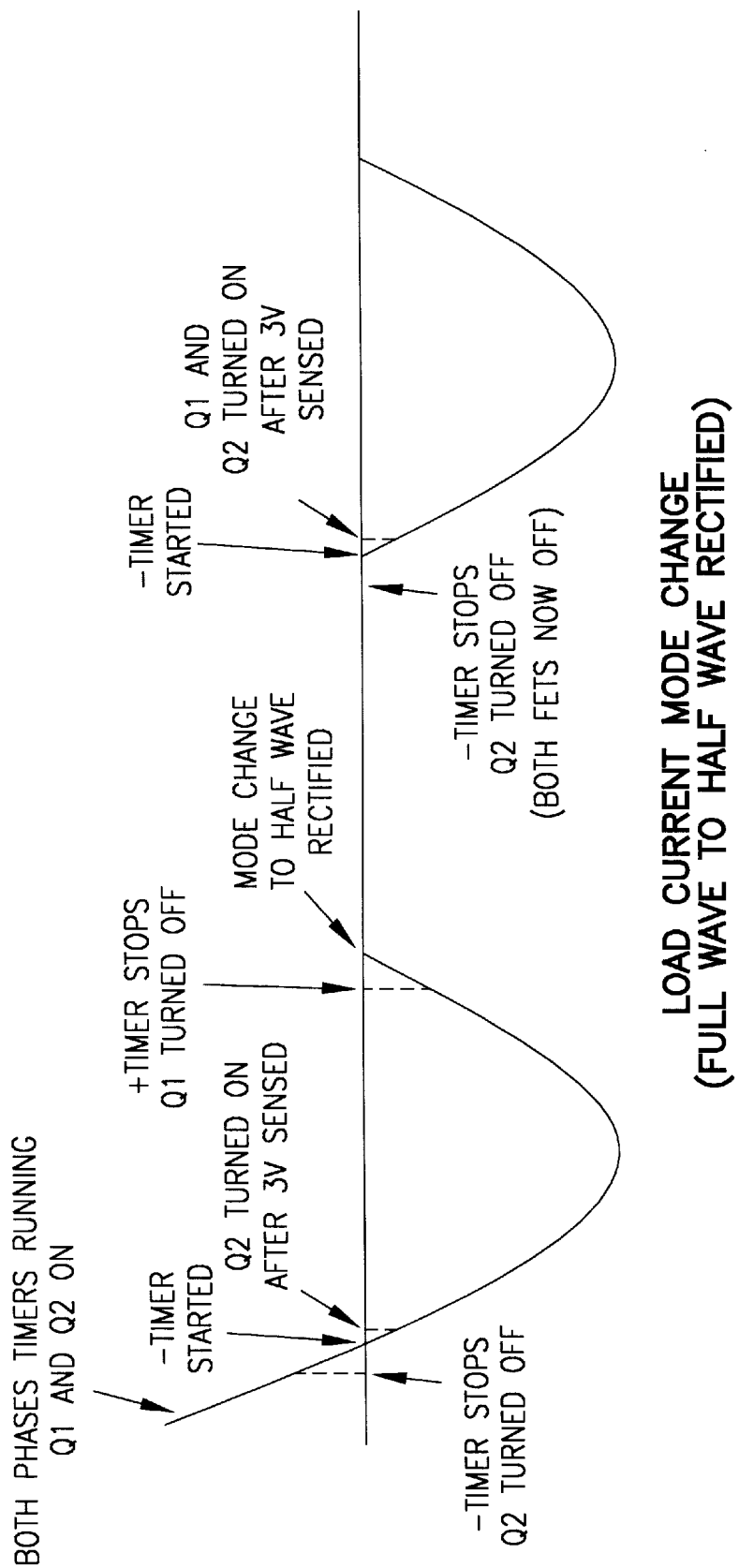
FIG. 7 illustrates the operation of the dual-timer embodiment when the load current changes from fill-wave to half-wave rectified.

FIG. 7 shows a load current mode change from full-wave to half-wave rectified. Assume that power stealing circuit 50 is operating as described above during the full-wave load current. As the load current is negative but increasing toward the zero crossing, the positive phase timer 102 expires as described above for fall-wave load currents. At this point, transistor $Q_1$ is turned off. As illustrated in FIG. 2, at this point the load current changes to a half-wave rectified current due to something changing inside the load. Positive phase timer 102 is never restarted by latch 103 even though transistor $Q_1$ is OFF because the voltage never continues in the positive direction. The voltage is blocked by the load. Next, negative phase timer 104 expires prior to the load current entering the negative phase of the waveform. At this point both positive phase timer 102 and negative phase timer 104 are now inactive. As described previously, switching logic 106 detects that both phase timers 102 and 104 are inactive and determines that the load current is either D.C. or half-wave rectified and thereafter controls transistors $Q_1$ and $Q_2$ accordingly as previously described. One skilled in the art will recognize that power stealing circuit 50 will also detect a change in load current from fall-wave to half-wave having opposite polarity from the half-wave load current depicted in FIG. 7.

Figure 8:
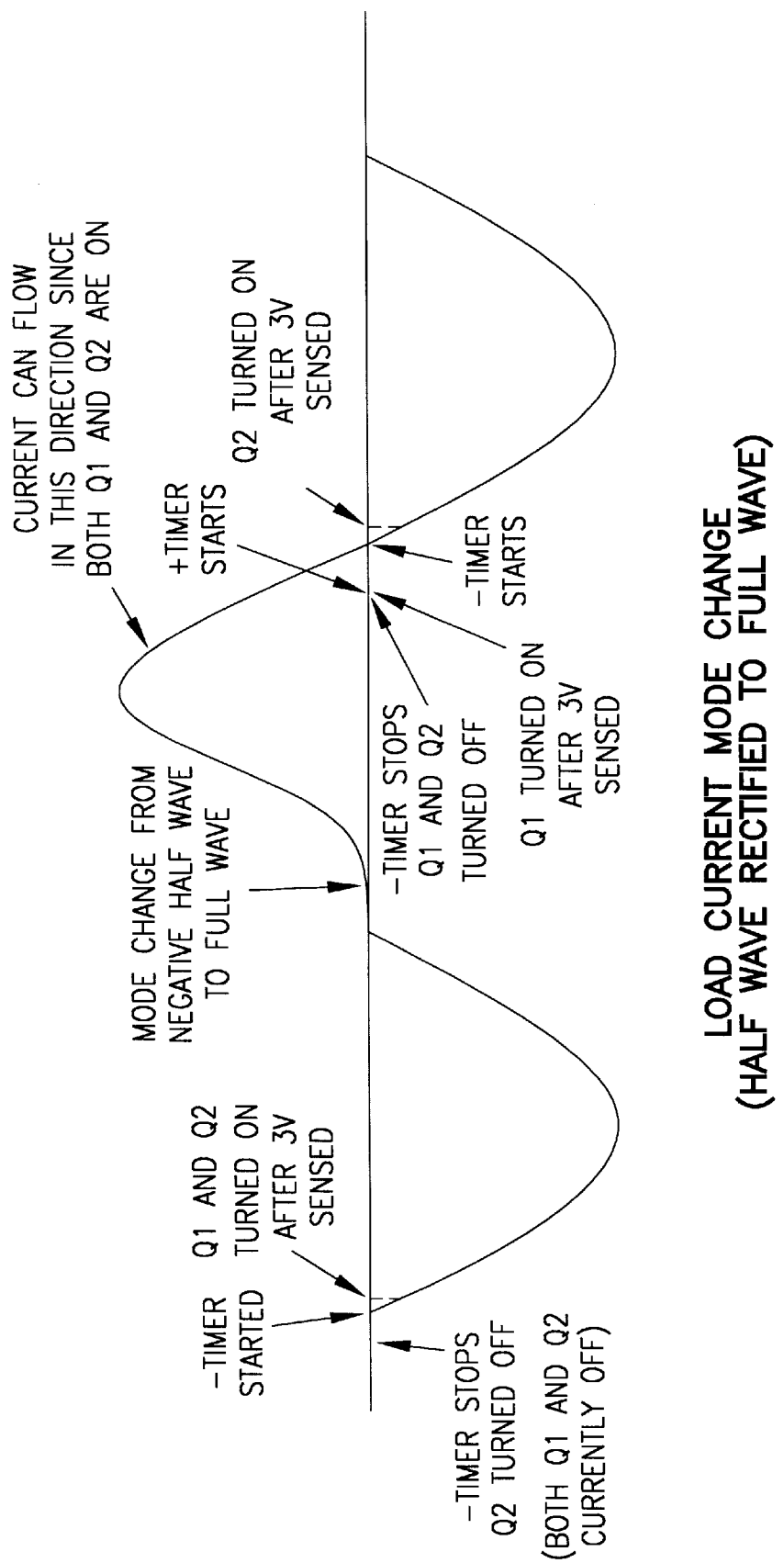
FIG. 8 illustrates the operation of the dual-timer embodiment when the load current changes from half-wave rectified to full-wave.

FIG. 8 shows a load current mode change from half-wave rectified to full-wave. As described for operation with a half-wave rectified load current, both transistors $Q_1$ and $Q_1$ are turned off simultaneously. As illustrated in FIG. 8, both transistors $Q_1$ and $Q_2$ are turned off prior to sensing the load current changing from half-wave to full-wave. This causes current to charge the low voltage capacitor $C_1$ and causing positive phase timer 102 to be activated and turning ON only transistor $Q_1$. As the load current reaches the zero crossing and continues negatively, negative phase timer 104 is activated. At this point, both phase timers 102 and 104 are active. Switching logic 106 detects that both phase timers 102 and 104 are active and determines that the load current a full-wave alternating current and thereafter controls transistors $Q_1$ and $Q_2$ accordingly as previously described. After switching logic 106 detects the load current has switched to full-wave alternating current, it may take a few cycles before positive phase timer 102 synchronizes correctly to the beginning the positive half-cycle. The time period of the phase timers 102 and 104 can be reduced to increase the speed of synchronization at the cost of more power loss through the body diodes of $Q_1$ and $Q_2$.

Single timer Embodiment

Figure 9:
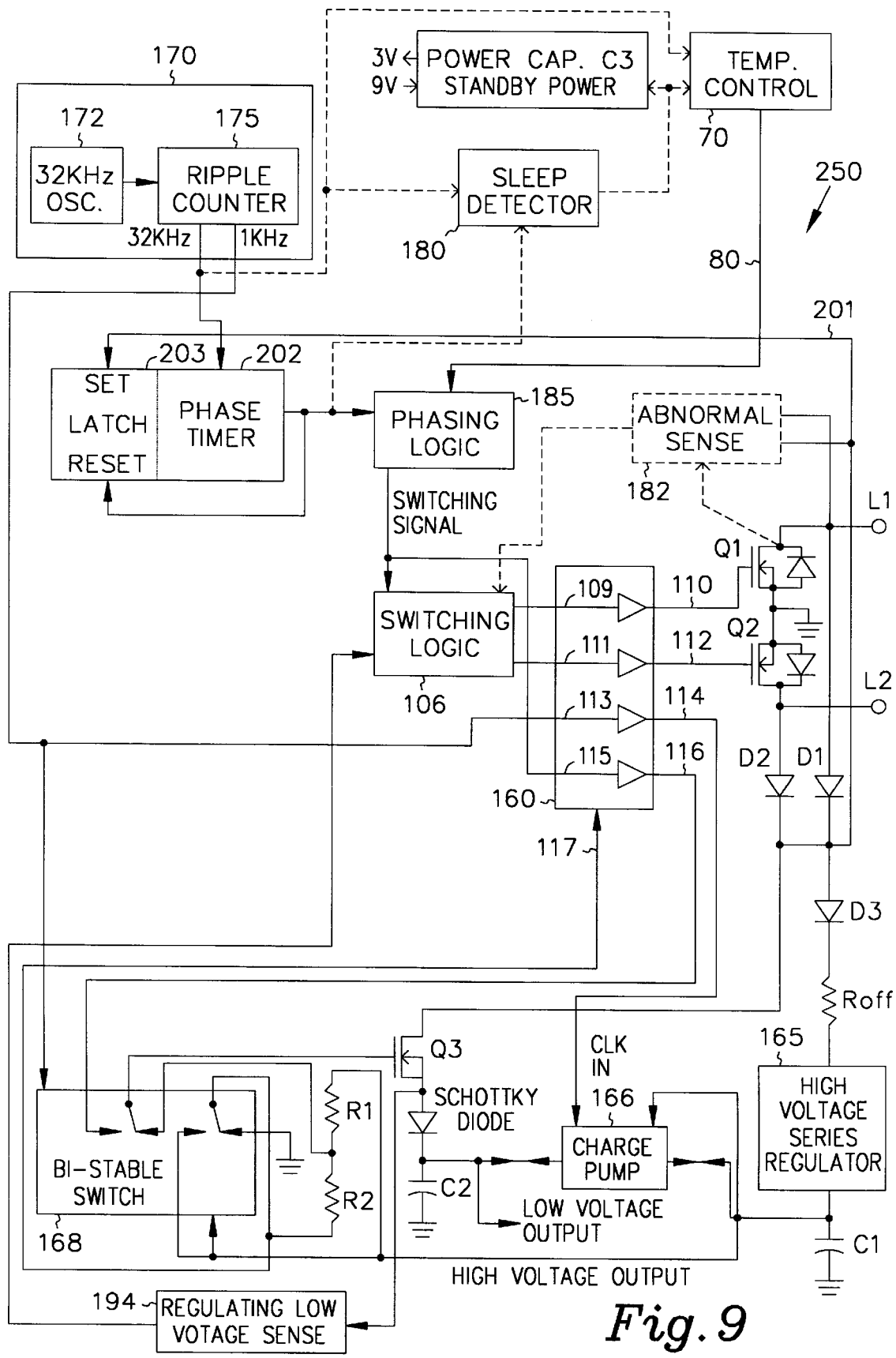
FIG. 9 is a functional diagram of a single-timer embodiment of the power stealing circuit.

In another embodiment, illustrated in FIG. 9, power stealing circuit 250 comprises a single phase timer 202 and is optimized only for stealing power from a symmetrical alternating load current. In unsymmetrical load current conditions, the time between zero crossings for opposite polarity portions of the current waveform is not equal which would make a single timer unacceptable. Specifically, the time between the zero crossing when the load current is rising and the zero crossing when the load current is falling is different than the time between the zero crossing when the load current is falling and the zero crossing when the load current is rising. This is illustrated in FIG. 4 which depicts a non-symmetrical load current.

Figure 10:
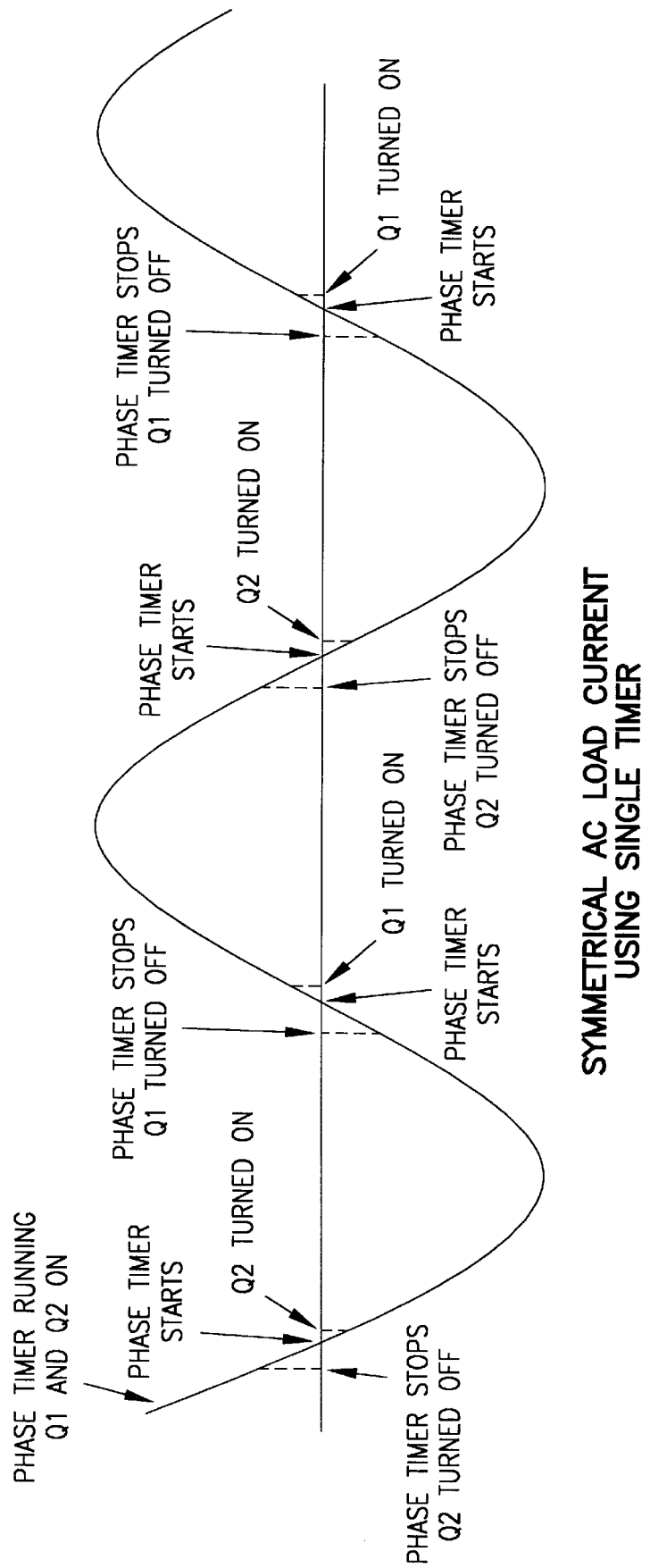
FIG. 10 illustrates the operation of the single-timer embodiment when the load current is a full-wave, symmetrical alternating current.

When the load current is symmetrical as illustrated in FIG. 10, the time between successive zero crossings is equal. Therefore, the timing of the zero crossing when the load current rising can be predicted from the timing of the zero crossing when the load current is falling and vice versa. Due to this symmetry, zero crossing detection may be accomplished using a single phase timer.

Referring again to FIG. 9, power stealing circuit 250 is very similar to power stealing circuit 50 shown in FIG. 2. Power stealing circuit 250 comprises transistors $Q_1$ and $Q_2$ having their sources connected in a series back-to-back configuration and their drains connected to the load terminals $L_1$ and $L_2$, respectively.

As in the dual counter embodiment previously described, transistors $Q_1$ and $Q_2$ are controlled by switching logic 106 which is coupled to transistors $Q_1$ and $Q_2$ by drivers 160 which provide a suitable voltage level for activating transistors $Q_1$ and $Q_2$. Switching logic 106 controls transistors $Q_1$ and $Q_2$ based upon inputs from phase timer 202. Power stealing circuit 250 may include phasing logic 185 in order to reduce the metal migration in the contacts of load device 90. Phasing logic 185 receives the output from phase timer 202 and the cycling output 80 from temperature control 70. Phasing logic 185 provides a switching signal to switching logic 106, the switching signal requesting the activation or deactivation of the load device 90.

Power stealing circuit 250 provides a low voltage output and a high voltage output using high voltage capacitor $C_1$, low voltage capacitor $C_2$, and charge pump 166 which operate as described in the dual counter embodiment. Furthermore, bi-stable switch 168 senses when high voltage storage capacitor $C_1$ reaches a sufficient voltage for its operation. At this point, bi-stable switch 168 places its double pole double throw switch in the conducting state shown in FIG. 9.

As in the dual counter embodiment, subcircuits for achieving other functions can be readily added to power stealing circuit 250. Such subcircuits may include sleep mode detector 180 and abnormal load sensor 182 which are powered by the low voltage operating supply output of power stealing circuit 250. If sleep mode detector 180 determines that phase timer 202 has been inactive for a predetermined period, such as 2 or 3 seconds, sleep mode detector 180 activates standby capacitor $C_3$ which supplies operating power for an extended period of time. In addition sleep detector 180 provides an output to temperature control 70 such that if power loss is detected, temperature control 70 stops cycling and minimizes its power drain.

As illustrated in FIG. 9, power stealing circuit 250 may include abnormal sense 182 which senses an overload current in transistors $Q_1$ and $Q_2$. When such a condition is sensed, abnormal sense 182 signals switching logic 106 which immediately turns off transistors $Q_1$ and $Q_2$, thereby protecting the transistors. Circuit 250 may include provisions for resuming normal operation after an abnormal load condition is sensed by occasionally turning back on transistors $Q_1$ and $Q_2$.

Operation of Single Timer Embodiment for Symmetric Load Current

FIG. 10 illustrates the operation of the single timer embodiment for a load current in power supply line 60 which has a symmetric, full-wave alternating waveform. The startup of power stealing circuit 250 is identical to that of the dual counter embodiment of FIG. 2. Therefore, both transistors $Q_1$ and $Q_2$ are active and phase timer 202 is running when the load current in supply line 60 is positive but decreasing toward zero.

Just prior to the zero crossing, phase timer 202 expires causing switching logic 106 to turn off transistor $Q_2$ such that the load current is forced to flow through the body diode of $Q_2$. This causes a small voltage loss to the load of about 0.7 volts until the voltage reaches the zero crossing. This slight increase in power loss has minimal effects since it occurs when the load current is approaching zero. This minimizes current changing power losses and places less requirements on the switching speeds of transistors $Q_1$ and $Q_2$.

After the load current reverses direction and flows into terminal $L_2$, it is forced into replenishing the charge on low voltage capacitor $C_2$ since no direct conductive path through transistors $Q_1$ and $Q_2$ exists. The load current flows into terminal $L_2$, through diode $D_2$, transistor $Q_3$, the Schottky diode, into the low voltage capacitor $C_2$, through the circuit common, through transistor $Q_1$, which is active, and out through terminal $L_1$. Diversion of the load current to recharge low voltage capacitor $C_2$ causes the voltage across terminals $L_2$ and $L_1$ to jump to a value slightly greater than the low voltage output. This voltage is fed back by line 201 to phase timer latch 203 thereby setting the latch and restarting phase timer 202. In this manner, phase timer 202 is restarted on each zero crossing, and will expire just prior to the next zero crossing.

After the first zero crossing, when some the load current is replenishing low voltage capacitor $C_2$, the voltage at the anode of the Schottky diode is increasing slightly in value. This voltage is slightly above the low voltage output to allow for the drop across the Schottky diode. When low voltage sense 194 senses a sufficient voltage at the anode of the Schottky diode, it activates its output causing switching logic 106 to turn transistor $Q_2$ back on. This allows the load current to again flow directly through the transistors $Q_1$ and $Q_2$ without being diverted through the power stealing portion of circuit 250, and with minimal voltage loss.

Similarly, just prior to the zero crossing in the positive direction, phase timer 202 expires causing switching logic 106 to turn off transistor $Q_1$ such that the load current is forced to flow through the body diode of the transistor $Q_1$. After the load current reverses direction and flows into terminal $L_1$, it is forced into replenishing the low voltage capacitor $C_2$ since no direct conductive path through transistors $Q_1$ and $Q_2$ exists. The load current flows into terminal $L_1$, through diode $D_1$, transistor $Q_3$, the Schottky diode, into the low voltage capacitor $C_2$, through the circuit common, through transistor $Q_2$, which is active, and out through terminal $L_2$. Reversal of the load current sets latch 203 and restarts phase timer 202. When low voltage sense 194 senses a sufficient voltage at the anode of the Schottky diode, it activates its output causing switching logic 106 to turn transistor $Q_1$ back on. As a result, the load current flows directly through the transistors $Q_1$ and $Q_2$ without being diverted through the power stealing portion of circuit 250.

Direct Current Source Embodiment

Figure 11:
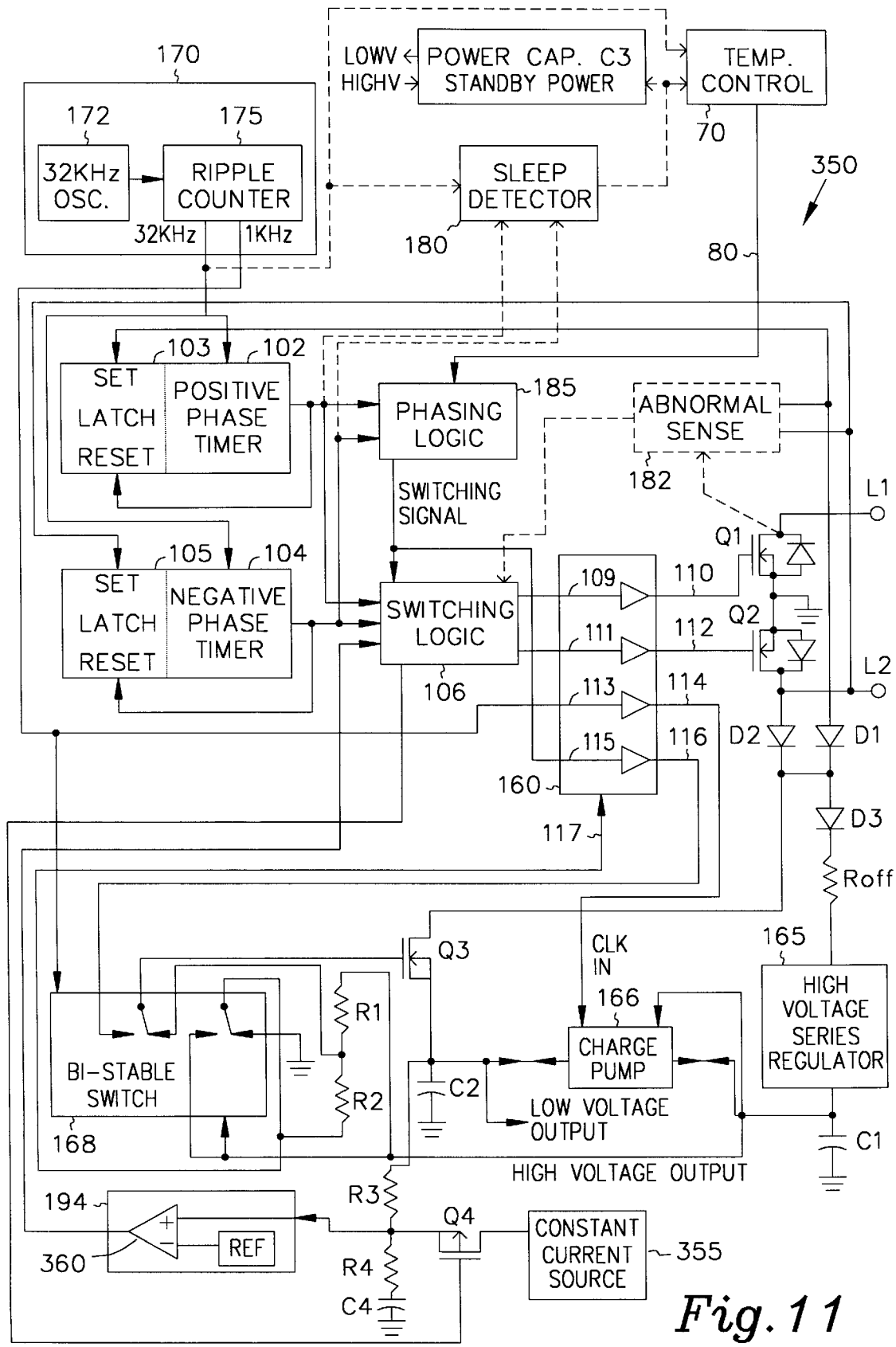
FIG. 11 is a functional diagram of an alternate embodiment of the power stealing circuit comprising dual-timers.

FIG. 11 illustrates an alternative power stealing solid state switch circuit embodiment 350, which is capable of stealing power from a variety of load currents including symmetrical A.C., non-symmetrical A.C., rectified A.C., and D.C. currents.

Circuit 350 is very similar to circuit 50 shown in FIG. 2. Power stealing circuit 350 comprises transistors $Q_1$ and $Q_2$ having their sources connected in a series back-to-back configuration and their drains connected to the load terminals $L_1$ and $L_2$, respectively. Transistors $Q_1$ and $Q_2$ are controlled by switching logic 106 which is coupled to transistors $Q_1$ and $Q_2$ by drivers 160 which provide a suitable voltage level for activating transistors $Q_1$ and $Q_2$. Switching logic 106 controls transistors $Q_1$ and $Q_2$ based upon inputs from positive phase timer 102 and negative phase timer 104. Phasing logic 185 and temperature control 70 operate as previously described.

Circuit 350 provides low and high voltage operating power outputs using high voltage capacitor $C_1$, low voltage capacitor $C_2$, and charge pump 166 which operate as described in the circuit embodiment of FIG. 2. Bi-stable switch 168 operates as previously described. Circuit 350 may also include sleep mode detector 180 and abnormal load sensor 182, which are powered by the low voltage output.

One benefit of power stealing circuit 350 is the elimination of the Schottky diode. By elimination the Schottky diode, there is no voltage drop between the source of transistor $Q_3$ and low voltage capacitor $C_2$.

Power stealing circuit 350 comprises a transistor $Q_4$ which is any suitable power switch such as a "P channel" field-effect transistor, a voltage divider formed by resistors $R_3$ and $R_4$, and a constant current source 355. The gate of transistor $Q_4$ receives an output from switching logic 106 which indicates that either phase timer 102 or phase timer 104 has been turned off and then back on as occurs when circuit 350 is stealing operating power. In this manner, transistor $Q_4$ is activated near the zero crossing of the load current, when capacitor $C_2$ is being recharged. The drain of transistor $Q_4$ is connected to constant current source 355 while the source electrode of the transistor is connected to the voltage divider network formed by $R_3$ and $R_4$.

Operation of Constant Current Source Embodiment

Power stealing circuit 350 operates very similar to the dual-timer circuit embodiment of FIG. 2. Referring generally to FIG. 3, positive phase timer 102 expires shortly before the zero crossing near the end of the negative half cycle of the load current. The expiration of positive phase timer 102 causes switching logic 106 to turn off transistor $Q_1$, causing load current to pass through its body diode. When the load current crosses zero and reverses, a positive voltage is created on terminal $L_1$. The positive voltage is fed back to latch 103 of positive phase timer 102 and restarts the timer. Switching logic sets an additional output which switches on transistor $Q_4$, thereby switching the output of constant current source 355 to the junction of voltage divider resistors $R_3$ and $R_4$. The current flows through resistor $R_4$ and capacitor $C_4$ and creates a small positive voltage step. Low voltage sense 194 comprises a comparator 360 which receives the voltage step on its positive input. The negative input of comparator 360 of low voltage sense 194 is connected to receive a reference voltage. The positive voltage step alone on the positive input of comparator 360 is not enough to cause it to switch.

When a sufficient voltage is present at terminal $L_1$, current flows through diode $D_2$ and transistor $Q_3$ ultimately charging low voltage capacitor $C_2$. Concurrently, when transistor $Q_4$ is in a conducting state, current from constant current source 355 flows through $R_4$ and increases the voltage across capacitor $C_4$, which voltage increase is reflected into the positive input of comparator 360.

The voltage at the plus input of comparator 360 is combination of the low voltage from $C_2$ and a smaller amount from that of the constant current source as it creates a voltage across $R_4$ and $C_4$. If the low voltage on $C_2$ would drop then more voltage would be required from $C_4$ to trip comparator 360. Since the voltage on $C_4$ is a ramp function it then takes a longer time to reach the trip point and thus more charging time on $C_2$ to replenish its voltage. The inverse is true if the voltage on $C_2$ became too large. Thus regulation of $C_2$ takes place and comparator 360 is recycled each charge period.

When the voltage on the positive terminal of the comparator is sufficient, output of the comparator goes high. With the comparator output high, switching logic 106 turns on transistor $Q_1$ to bypass the load current and thereby stopping the charging of the low voltage capacitor $C_2$. Switching logic 106 inhibits the flow of constant current through transistor $Q_4$ causing an immediate small drop in voltage to the positive input of comparator 360 because of the drop in current through $R_4$. Comparator 360 switches its output back to a low voltage. Power stealing circuit 350 operates in a similar manner for the negative phase of the load current. Power stealing circuit 350 effectively steals power from the various load currents similar to the operation of the dual timer embodiment described previously.

Conclusion

Various embodiments of a power stealing circuit have been described. Such a device is suitable for an environment in which a load is activated by a power supply line. The embodiments described operate with a wide variety of load currents and are capable of power a wide variety of suitable low-voltage thermostat or other control devices. This application is intended to cover any adaptations or variations of the present invention. It is manifestly intended that this invention be limited only by the claims and equivalents thereof.

I claim:

1. A power stealing circuit for controlling the current in a power supply line to a load in response to the cycling output of an environmental control and providing operating power for the environmental control, comprising:

first and second terminals for connection in series with the load;

first and second transistors, each transistor having a source, a gate, and a drain, the drain of the first transistor connected to the first terminal, the drain of the second transistor connected to the second terminal, the source of the first transistor connected to the source of the second transistor;

switching logic operatively connected to control the switching of the first and second transistors in low impedance on states in which current is permitted to flow to the load and high impedance off states in which current is substantially blocked from the load, in response to the cycling output of the environmental control, and further operative to independently control the switching of the first and second transistors during the on states for power stealing;

a power storage circuit for providing operating power for the environmental control and connected to receive current diverted from the load when a transistor is in its off state;

a voltage sense coupled to the power storage circuit and operative to signal the switching logic when the voltage in the power storage circuit reaches a predetermined level;

the switching logic including timing control operative at intervals to switch a transistor off to thereby cause the transistor to enter its high impedance state to temporarily divert current to the power storage circuit, and the switching logic operative to switch the transistor on when the voltage sense indicates that the predetermined level has been reached.

2. Apparatus according to claim 1 wherein the timing control of the switching logic is coupled to the periodicity of the power to be supplied to the load so that the transistor is caused to switched off at or near the zero crossing of the power being supplied to the load.

3. Apparatus according to claim 1 adapted for use in connection with symmetric alternating load currents wherein the timing control includes a single phase timer connected to control the first and second transistors during successive phases of the power to be supplied to the load.

4. Apparatus according to claim 1 further including a second power storage circuit for providing operating power at a higher voltage than that provided for the environmental control, for use in controlling the gates of the transistors, and a charge pump for converting voltage between the first and second power storage circuits.

5. Apparatus according to claim 1 further comprising phasing logic operative in conjunction with the switching logic to connect the load on alternate phases of an alternating current being supplied to the load for different activations of the load.

6. Apparatus according to claim 1 further comprising an abnormal sense coupled across the first terminal and the second terminal, the abnormal sense signaling the switching logic when the current sensed in the first transistor and the second transistor is greater than a fixed overload threshold.

7. Apparatus according to claim 1 wherein the timing control includes a phase timer having a time period less than a phase period of the power to be supplied to the load, and wherein the switching logic is operative during power stealing to remove the drive to the gate of a conducting transistor near the end of a phase, so that the transistor substantially blocks the flow of current to the load and diverts it to the power storage circuit at the start of the next phase.

8. Apparatus according to claim 7 wherein the timing control includes a pair of phase timers having time periods corresponding to alternate phases of the of the current to be supplied to the load, connected respectively to control the first and second transistors during successive phases of the power to be supplied to the load.

9. Apparatus according to claim 7 further comprising a sleep detector coupled to the output of the phase timer wherein the output of the sleep detector is set when the phase has not expired within a fixed activity period, and a standby capacitor for holding standby power, the sleep detector activating the standby capacitor when the phase timer has not expired within a fixed activity period.

10. A power stealing circuit for diverting power from a load to provide operating voltage for a cycling environmental control for the load, comprising:

a pair of terminals for series connection to the load;

a pair of transistors connected to the terminals and to each other for providing a high or low impedance path through to the load depending on switching signals applied to their gates;

switching logic for controlling the transistors in response to load cycling commands of the environmental control and in response to the need for stolen operating power;

a low voltage supply for supplying operating voltage to the environmental control;

a high voltage supply for supplying operating voltage high enough for control of the gates of the transistors;

a first diversion path operative to deliver power to the high voltage supply when the load is cycled off;

a second diversion path operative in conjunction with the switching logic to deliver power to the low voltage supply when the load is cycled on by periodically momentarily holding power transistors off until sufficient power has been thus diverted to supply the low voltage needs; and a bidirectional charge pump operatively connected to transfer power from the high voltage supply to the low voltage supply during the off cycle of the load and from the low voltage supply to the high voltage supply during the on cycle.

11. A power stealing circuit according to claim 10 wherein the switching logic includes a phase timer for switching of a transistor near a phase reversal of the power being supplied to a load, so that the power is stolen at a low current portion of the power waveform delivered to the load.

12. A power stealing circuit according to claim 10 wherein the switching logic includes a pair of phase timers for respectively switching the transistors near a phase reversal of alternate phases of the power being supplied to a load, so that the power is stolen at a low current portion of the power waveform delivered to the load.

13. A power stealing circuit for controlling the current in a power supply line to a load in response to the cycling output of an environmental control and providing operating power for the environmental control, comprising:

first and second terminals for connection in series with the load;

first and second transistors, each transistor having a source, a gate, and a drain, the drain of the first transistor connected to the first terminal, the drain of the second transistor connected to the second terminal, the source of the first transistor connected to the source of the second transistor;

a first phase timer having an output indicating an expiration of a period defined by the first phase timer;

a second phase timer having an output indicating an expiration of a period defined by the second phase timer;

switching logic operatively connected to control the switching of the first and second transistors in low impedance on states in which current is permitted to flow to the load and high impedance off states in which current is substantially blocked from the load;

the switching logic operative in response to a off cycle command by the environment control to switch the transistors to their off states to deactivate the load;

the switching logic operative in response to a on cycle command by the environment control to switch the transistors to their on state and to periodically and temporarily switch the first and second transistors off in response to the expiration of the periods of the first and second phase timers, respectively;

a power storage circuit for providing operating power for the environmental control and connected to receive current diverted from the load when a transistor is in its off state; and a voltage sense coupled to the power storage circuit and to signal the switching logic to turn back on a transistor which had been turned off when the voltage in the power storage circuit reaches a predetermined level.

14. A power stealing circuit according to claim 13 where comprising a second power storage circuit receiving diverted current when the transistors are switched off in the off cycle of the environmental control, and storing power at a higher voltage than the first power storage circuit, sufficient for driving the gates of the transistors.

15. A power stealing circuit according to claim 14 further including a bidirectional charge pump operatively connected to transfer power at converted voltage between the first and second power storage circuits, from the one receiving diverted power at a given time to the other.

16. A power stealing circuit according to claim 13 wherein the switching logic receives the outputs of the first and second phase timers, the switching logic determining that the supplied current is alternating if the first phase timer and the second phase timer are active simultaneously, the switching logic determining that the supplied current is direct or nonsymmetric if the first phase timer and the second phase timer are inactive simultaneously.

17. A power stealing circuit according to claim 13 wherein the period of the first phase timer is preset according to a positive phase of the supply current.

18. A power stealing circuit according to claim 13 wherein the period of the second phase timer is preset according to a negative phase of the supply current.

19. A power stealing circuit according to claim 13 further comprising phasing logic coupled between the cycling output and the switching logic, the phasing logic for receiving the cycling output and providing a switching signal to the switching logic wherein the switching signal is activated on alternating phases of the supply current for successive activations of the load.

20. A power stealing circuit according to claim 13 further comprising a sleep detector having an output, the sleep detector coupled to the output of a phase timer wherein the output of the sleep detector is set when a phase has not expired within a fixed activity period, the sleep detector receiving power from the first voltage output of the first voltage storage.

21. A power stealing circuit according to claim 13 further comprising a standby capacitor for holding standby power, the sleep detector activating the standby capacitor when a phase timer has not expired within a fixed activity period.

22. A power stealing circuit according to claim 13 further comprising an abnormal sense coupled across the first power terminal and the second power terminal, the abnormal sense signaling the switching logic when the current sensed in the first transistor and the second transistor is greater than a fixed overload threshold.

23. A power stealing circuit for controlling the current in a power supply line to a load in response to the cycling output of an environmental control and providing operating power for the environmental control, comprising:

first and second terminals for connection in series with the load;

first and second transistors, each transistor having a source, a gate, and a drain, the drain of the first transistor connected to the first terminal, the drain of the second transistor connected to the second terminal, the source of the first transistor connected to the source of the second transistor;

a least one phase timer having an output indicating an expiration of a period defined by the phase timer;

switching logic operatively connected to control the switching of the first and second transistors in low impedance on states in which current is permitted to flow to the load and high impedance off states in which current is substantially blocked from the load;

the switching logic operative in response to a off cycle command by the environment control to switch the transistors to their off states to deactivate the load;

the switching logic operative in response to a on cycle command by the environment control to switch the transistors to their on state and to periodically and temporarily switch the first and second transistors off in response to the expiration of periods of the phase timers, respectively;

a power storage circuit for providing operating power for the environmental control and connected to receive current diverted from the load when a transistor is in its off state; and a voltage sense coupled to the power storage circuit and to signal the switching logic to turn back on a transistor which had been turned off when the voltage in the power storage circuit reaches a predetermined level.

24. A power stealing circuit according to claim 23 further comprising a second power storage circuit receiving diverted current when the transistors are switched off in the off cycle of the environmental control, and storing power at a higher voltage than the first power storage circuit, sufficient for driving the gates of the transistors.

25. A power stealing circuit according to claim 24 further including a bi-directional charge pump operatively connected to transfer power at converted voltage between the first and second power storage circuits, from the one receiving diverted power at a given time to the other.

* * * * *